(12) United States Patent
Lum

(10) Patent No.: US 8,231,146 B2
(45) Date of Patent: *Jul. 31, 2012

(54) ELECTROLYSIS-RESISTANT COUPLING ASSEMBLY

(75) Inventor: Ken Lum, Fresno, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,672

(22) Filed: Apr. 2, 2010

(65) Prior Publication Data

US 2010/0187816 A1    Jul. 29, 2010

Related U.S. Application Data

(63) Continuation of application No. 11/476,272, filed on Jun. 28, 2006, now Pat. No. 7,712,797, which is a continuation-in-part of application No. 11/246,991, filed on Oct. 7, 2005, now Pat. No. 7,604,217.

(51) Int. Cl.
F16L 23/00    (2006.01)
(52) U.S. Cl. .......................... 285/414; 285/412; 285/388
(58) Field of Classification Search .................... 285/47, 285/414, 412, 388, 368, 415
See application file for complete search history.

(56) References Cited

U.S. PATENT DOCUMENTS

| | | | | |
|---|---|---|---|---|
| 1,186,325 A | * | 6/1916 | Metzger | 285/388 |
| 1,201,022 A | * | 10/1916 | Conniff | 285/387 |
| 1,232,129 A | * | 7/1917 | Wafer | 285/414 |
| 2,653,834 A | * | 9/1953 | Purkhiser | 285/50 |
| 3,782,419 A | * | 1/1974 | Hanson | 285/47 |
| 3,861,719 A | * | 1/1975 | Hand | 285/47 |
| 4,372,529 A | * | 2/1983 | Kato | 285/388 |
| 4,595,218 A | * | 6/1986 | Carr et al. | 285/47 |
| 4,676,479 A | * | 6/1987 | Ogawa et al. | 285/388 |
| 5,775,743 A | * | 7/1998 | Rochelle | 285/388 |
| 6,158,782 A | * | 12/2000 | Stanley et al. | 285/368 |
| 7,178,838 B2 | * | 2/2007 | Chelchowski et al. | 285/388 |
| 7,340,817 B2 | * | 3/2008 | Hayes, Jr. | 285/415 |
| 7,481,462 B2 | * | 1/2009 | Arning et al. | 285/414 |
| 7,527,306 B2 | * | 5/2009 | Ben-Horin | 285/414 |
| 7,604,217 B2 | * | 10/2009 | Lum | 285/368 |
| 7,712,797 B2 | * | 5/2010 | Lum | 285/414 |

* cited by examiner

*Primary Examiner* — David E Bochna
(74) *Attorney, Agent, or Firm* — The Small Patent Law Group LLC; Dean Small

(57) ABSTRACT

An electrolysis-resistant coupling assembly for connection with a line fitting of a fluid line includes a fitting having a first mating surface and having an aperture extending therethrough, wherein the fitting is configured to be aligned with and face the line fitting for coupling thereto. The assembly also includes a coupler having one end provided with an outer coupler flange, the fitting being loaded onto the coupler such that the outer coupler flange passes through the aperture. The assembly also includes a substantially non-compressible, electrically non-conductive rigid captive ring. The captive ring is positioned against the outer coupler flange and interposed between the fitting and the coupler to provide electrical separation between the fitting and the coupler, wherein the fitting is held against the captive ring when the fitting is interconnected with the line fitting.

31 Claims, 12 Drawing Sheets

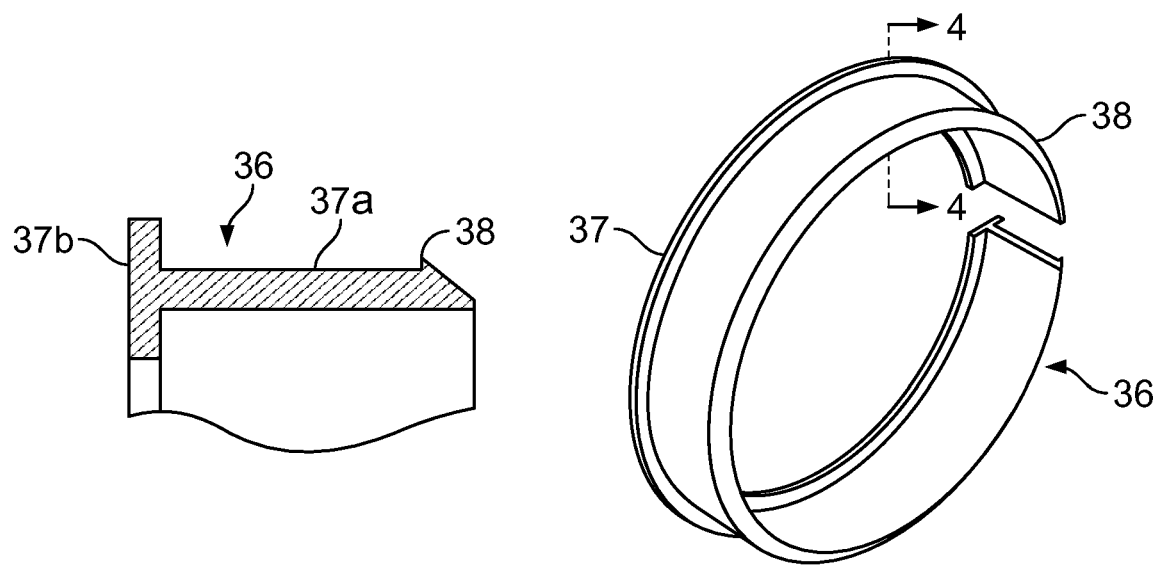
FIG. 4   FIG. 5
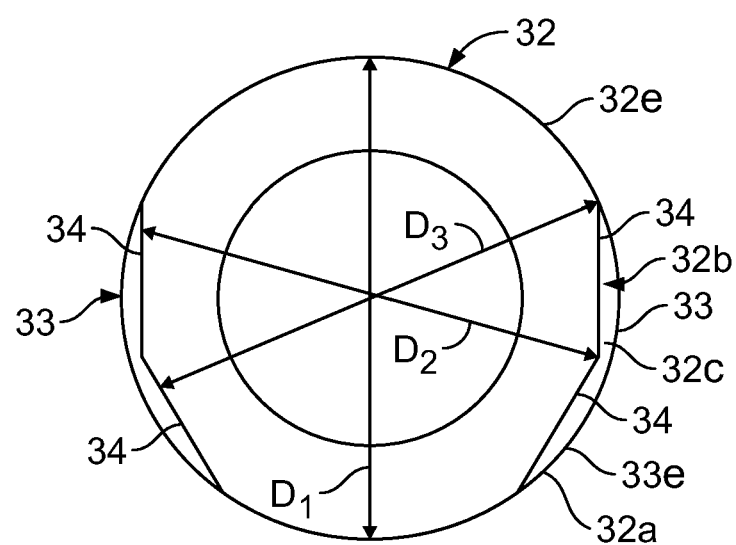
FIG. 7

ELECTROLYSIS-RESISTANT COUPLING ASSEMBLY

CROSS REFERENCE TO RELATED APPLICATIONS

The present application is a continuation, and claims priority from, U.S. application Ser. No. 11/476,272, now U.S. Pat. No. 7,712,797, filed Jun. 28, 2006, which is a continuation in part of U.S. application Ser. No. 11/246,991, now U.S. Pat. No. 7,604,217, filed Oct. 7, 2005, the complete subject matter of both of which are expressly incorporated herein by reference in their entirety.

BACKGROUND OF THE INVENTION

The present invention generally relates to fluid coupling assemblies and more particularly to a universal fluid coupling assembly that supports interchangeable fittings of different types to be used with a common housing based upon the type of mating coupling.

Today, a wide variety of coupling assemblies are used in fluid distribution systems. The coupling assemblies may be provided alone, or on various equipment, such as pumps, valves, circulators, meters and the like. Each type of coupling assembly is configured for use with a particular type of fluid, such as water, oil, fuel, sewage and the like. Examples of existing coupling types include flange fittings, threaded union fittings, sweat fittings, and NPT fittings.

For historic reasons, different applications have used certain types of couplings, regardless of whether such coupling remains today to be the most convenient for the application. Also, different geographic areas (e.g. different countries) may predominantly use certain types of couplings for a given application. For example, in Europe, a certain groundwater applications may utilize one type of coupling (e.g. a threaded union), while, in United States, the same groundwater application may utilize a different type of coupling (e.g. a flange).

For convenience, it is generally preferred to continue to use the same type of coupling that has historically been used in a certain application and geographic area. Continuity of use of the traditional coupling limits the need for plumbing to convert between different coupling types, as well as reduces the number of different types of couplings that an individual may need to carry or stock. Otherwise, one individual would be required to carry in stock numerous different types of couplings, where each type of coupling included a separate and dedicated overall structure. Consequently, it was unduly expensive to fully stock a wide variety of couplings and not practical for the "do it yourself" market or smaller contractors.

In recent times, more interest has been given to simplify the structures of, and steps for installing, fluid distribution systems and plumbing. The growing interest to simplify these systems and plumbing is due, in part, to the desire of contractors to improve efficiency and reduce inventory and, in part, due to the interest of individuals to perform more home repair and improvement.

A need remains for an universal coupling assembly that may be used in different applications and with different types of mating connectors. It is an object of certain embodiments of the present invention to address the above concerns and other problems experienced heretofore.

BRIEF DESCRIPTION OF THE INVENTION

In accordance with certain embodiments, an electrolysis-resistant coupling assembly is provided for connection with a line fitting of a fluid line. The assembly includes a fitting having a first mating surface and having an aperture extending therethrough, wherein the fitting is configured to be aligned with and face the line fitting for coupling thereto. The assembly also includes a coupler having one end provided with an outer coupler flange, the fitting being loaded onto the coupler such that the outer coupler flange passes through the aperture. The assembly also includes a substantially non-compressible, electrically non-conductive rigid captive ring. The captive ring is positioned against the outer coupler flange and interposed between the fitting and the coupler to provide electrical separation between the fitting and the coupler, wherein the fitting is held against the captive ring when the fitting is interconnected with the line fitting.

In another embodiment, an electrolysis-resistant coupling assembly for connection with a line fitting of a fluid line is provided that includes a fitting having a first mating surface and an aperture extending therethrough, with the aperture having a first bore and a second bore, and with the second bore being larger than the first bore forming a lip spaced from the first mating surface. The assembly also includes a coupler having one end provided with an outer coupler flange and an inner coupler flange, with the inner and outer coupler flanges extending radially outwardly from the coupler proximate the one end and being arranged in axially spaced relation thereon. The assembly also includes a substantially non-compressible, electrically non-conductive captive ring extending at least partially circumferentially around the coupler and being positioned between the outer coupler flange and the inner coupler flange such that the captive ring provides complete separation between the fitting and the coupler. The captive ring has a base extending axially and a leg extending radially outward from the base, with the leg being interposed between the lip and the outer coupler flange of the valve coupler. The fitting is configured to interconnect with the line fitting to hold the lip against the captive ring and the outer coupler flange.

In a further embodiment, an electrolysis-resistant coupling assembly for connection with a line fitting of a fluid line is provided that includes a fitting having a first mating surface and an aperture extending therethrough and a coupler having one end provided with an outer coupler flange and an inner coupler flange. The flanges extending radially outwardly from the one end and being arranged in axially spaced relation thereon. The assembly also includes a substantially non-compressible, electrically non-conductive captive ring extending at least partially circumferentially around the valve coupler and being positioned between the outer coupler flange and the inner coupler flange. The captive ring includes a base, a leg extending outward from the base, and the captive ring is positioned between the fitting and the coupler to provide a physical barrier between the fitting and the coupler.

BRIEF DESCRIPTION OF THE DRAWINGS

FIG. 4 is a cross-sectional view, taken on the line 4-4 in FIG. 5;

FIG. 5 is a perspective view of the split ring, taken to an enlarged scale;

FIG. 7 is a front elevational view of the valve coupler, showing the outer coupler flange and the inner coupler flange;

DETAILED DESCRIPTION OF THE INVENTION

Figure 1:
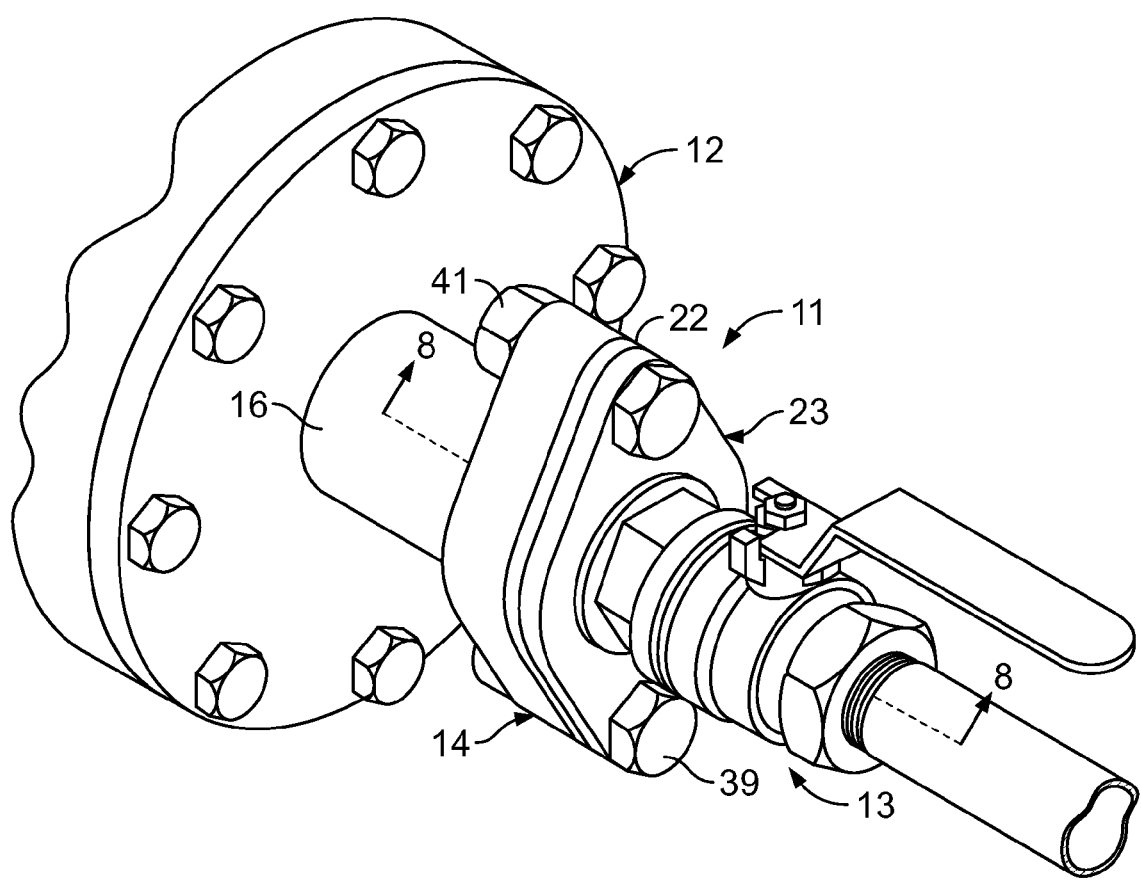
FIG. 1 is a right-front perspective view of a pump, coupling assembly, and valve formed in accordance with an embodiment of the present invention.

Turning now to the drawings, and in particular to FIG. 1, an universal coupling assembly 11 is shown in combination with a pump 12 and a valve 13. In this particular arrangement, the valve 13 serves either to isolate the pump 12 hydraulically for service, or to control the output flow of the pump. However, the coupling assembly 11 and valve 13 may be located at the input of the pump, or employed at the input or the output of other hydraulic devices. Optionally, the coupling assembly 11 may be provided with other types of plumbing or hydraulic devices, such as circulators, flow meters and the like. Optionally, the coupling assembly 11 may be provided as a stand alone unit that has a fixed type of fitting on one end and an universal fitting on the opposite end. Alternatively, the coupling assembly 11 may include universal fittings on both ends thereof.

A line flange 14 is attached to a pump output line 16, which in turn has an upstream end connected to the discharge port of pump 12. Line flange 14 includes a first mating surface 17 and a fluid passageway 18 extending therethrough. Bolt holes 19 and 21 are provided in the upper and lower portions of line flange 14. A gasket 22 is located immediately downstream from the line flange 14 and has one surface in contingent relation with first mating surface 17. Gasket 22 has a size and configuration similar to that of first mating surface 17. A non-conductive resilient material, such as rubber, may be employed for gasket 22.

A fitting member 23 is located downstream from the gasket 22 and the line flange 14. The fitting member 23 is constructed as a flange type fitting, although as explained below, other fitting types may be used in place thereof. As explained below, the coupler housing 31 is configured to have different types of fitting members loaded thereon. In accordance with certain embodiments of the present invention, the fitting member may be any one of flange type fitting, a union type fitting, a sweat type fitting or an NTP type fitting. Any one of the different types of fitting members may be loaded onto a common coupler housing 31. Fitting member 23 includes a second mating surface 24, substantially identical in size and configuration to that of gasket 22. Fitting member 23 also has a central aperture 26 passing therethrough. Aperture 26 has a larger first bore 27 and a smaller second bore 28, forming a lip 29.

The coupling assembly 11 generally includes a coupler housing 31 having an inner bore 31a and an outer perimeter 31c. The inner bore 31a extends along an axis 31d and opens onto a mating end 31b of the coupler housing 31. The coupler housing 31 has an outer coupler flange 32 that extends about the outer perimeter 31c and that is located proximate to the mating end 31b. The coupler housing 31 also has an inner coupler flange 33 that extends about the outer perimeter 31, but is located inward away from the mating end 31b to form a gap 31f between the inner and outer flanges 33 and 32. The inner coupler flange 33 had a periphery 33e that is substantially circular and continues without interruption.

FIG. 7 illustrates an end view of the coupler housing 31 to better show the relation between the periphery 33e of the inner coupler flange 33 and a periphery 32e of the outer coupler flange 32. As shown in FIG. 7, the outer coupler flange 32 has a periphery 32e that follows a predetermined circumferential envelope 32a and has at least one discontinuity 32b to define a blank area 32c in the envelope 32a. The circumferential envelope 32a is generally circular and the discontinuities 32b include at least one flat 34 cut across a portion of the circumferential envelope 32a to define the corresponding blank area 32c. In the exemplary embodiment, the flats 34 are cut as straight lines. Optionally, the flats 34 may be arcuate, concave and the like. In the example illustrated in FIG. 7, the circumferential envelope 32a includes multiple flats 34. For example, pairs of flats 34 are cut across different portions of the envelope 32a to define diametrically opposed blank areas. The envelope 32a has a diameter D1 when measured across a first area that has no discontinuities therein. The envelope 32a has different diameters D2 or D3 by example, both of which are smaller than the diameter dl in the first area. The diameters D2 and D3 are measured across the envelope 32a in different areas that intersect the discontinuities 32b.

The diameter D1 between the outermost portions of the envelope 32a corresponds to the diameter of the inner coupling flange 33 and is greater or larger than the inner diameter of the aperture 26 through the fitting member 23. The diameters D2 and D3 in areas where discontinuities 32b exist are smaller than the inner diameter of the aperture 26 through the fitting member 23.

Figure 2:
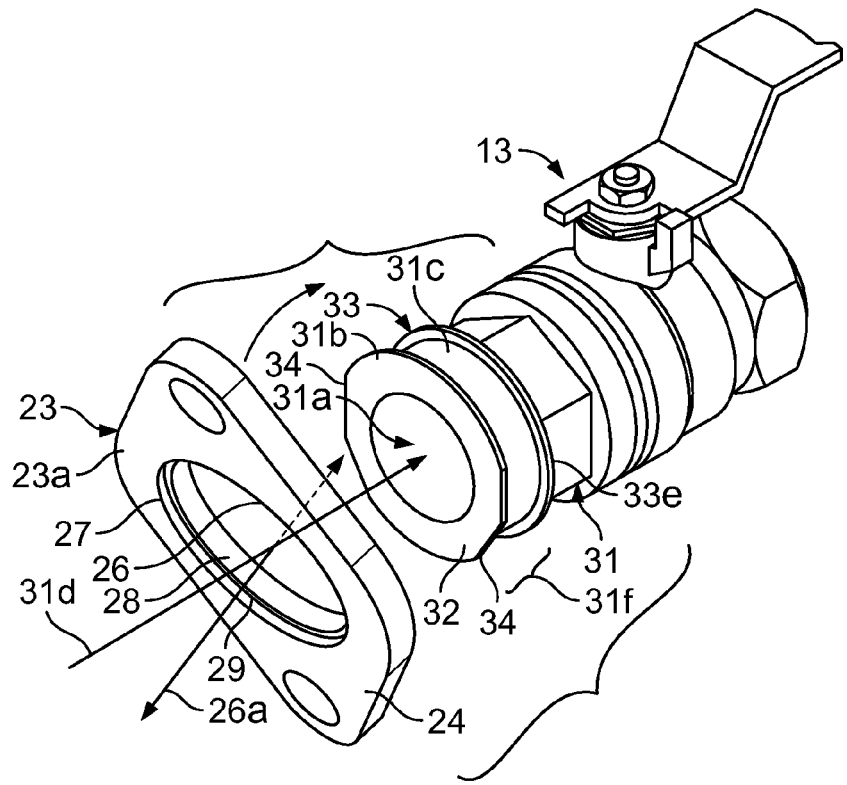
FIG. 2 is a left-front perspective view of the valve coupler and the valve, with the valve flange being installed over one end of the valve coupler in the manner indicated by the arrows.

Returning to FIGS. 2 and 3, the fitting member 23 is loaded over the outer coupler flange 32 onto the outer perimeter 31c of the coupler housing 31 by orienting the flange member 32 in a non-orthogonal relationship with the coupler housing 31 such that the outer coupler flange 32 is able to pass through the aperture 26. More specifically, as shown in FIG. 2, the aperture 26 is centered about a fitting axis 26a. The flange body 23a and the aperture 26 extend along a common plane. The axis 26a is oriented perpendicular to the plane containing the flange body 23a and the aperture 26. The flange body 23a is loaded onto the coupler housing 31 with the plane of the flange body 23a oriented at an acute angle to the axis 31d of the coupler housing 31.

In the present example, it is understood that the outer coupler flange 32 is aligned perpendicular to the axis 31d of the coupler housing 31. However, the outer coupler flange 32 may be oriented to extend about the coupler housing 32 at a non-orthogonal angle to the axis 31d of the coupler housing 31. Regardless of whether the outer coupler flange 32 is oriented perpendicular or non-perpendicular to the axis 31d, during a loading operation, the fitting member 23 is oriented such that the plane along which the aperture 26 extends (e.g. fitting plane) is oriented in a non-orthogonal relation (e.g. an acute angle) to the plane containing the outer coupler flange 32. When the outer coupler flange 32 is oriented perpendicular to the axis 31d of the inner bore 31a, the aperture 26 is tilted such that the fitting axis 26a forms a non-parallel angle to the axis 31d while loading the fitting member 23 onto the outer coupler flange 32.

Figure 3:
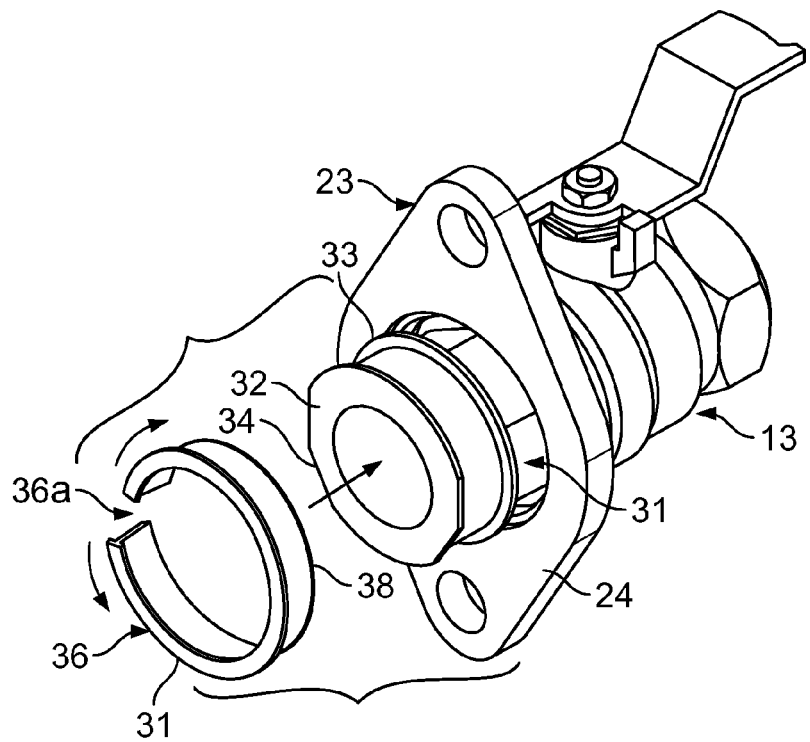
FIG. 3 is a perspective view as in FIG. 2, but with the valve flange installed and the split ring being installed over one end of the valve coupler.
Figure 6:
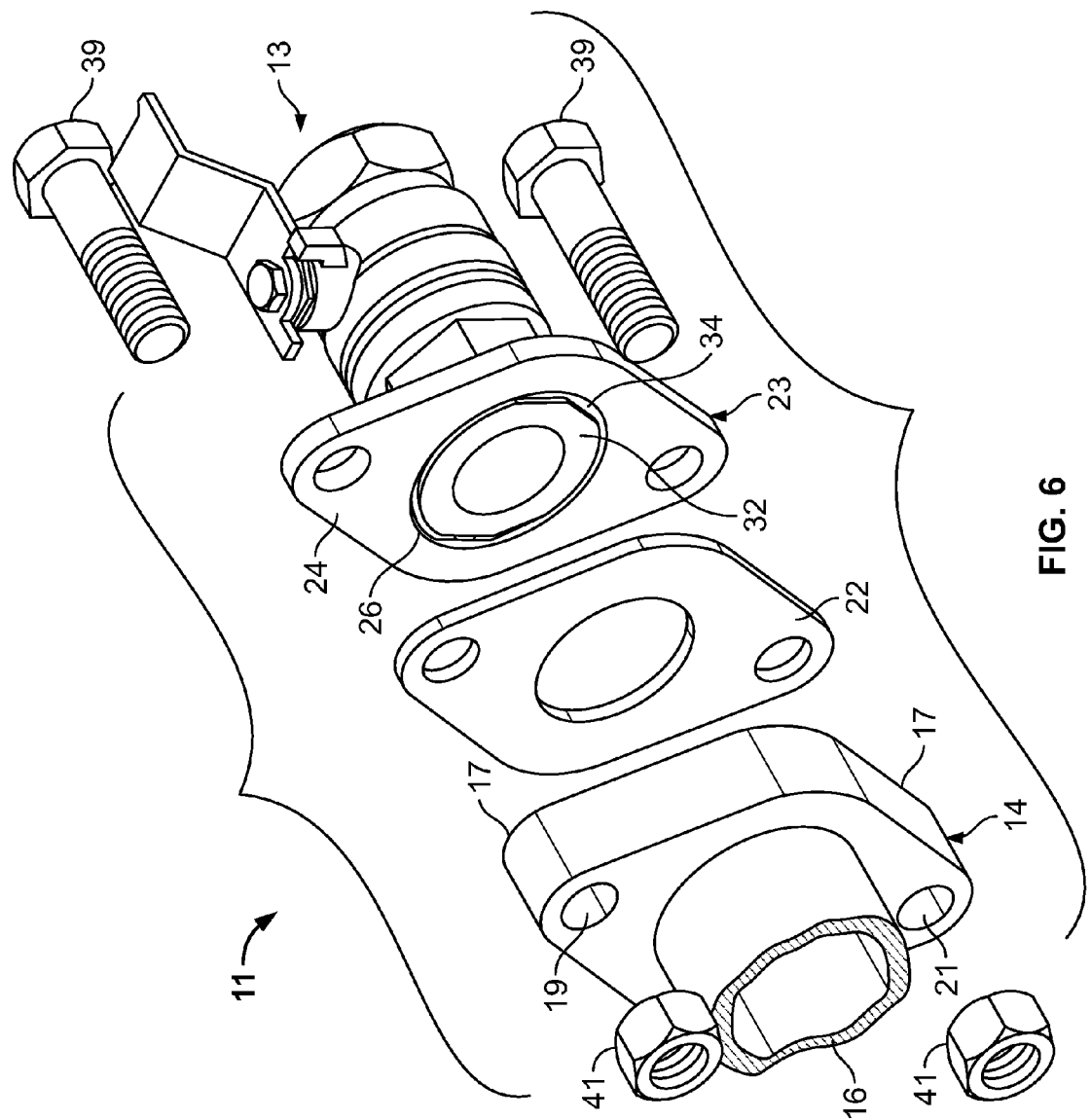
FIG. 6 is an exploded perspective view, showing the assembly of the valve flange, the rubber gasket, the pump flange, the valve coupler and the valve.

The flats 34 reduce the effective diameter of outer coupling flange 32 during the assembly of coupling assembly 11. For example, in FIG. 2, fitting member 23 is shown in the process of being installed over flanges 32 and 33. Providing that the axis of fitting member 23 is not coincident with the axis of the valve coupler 31 during this installation process, the presence of the flats 34 facilitates passage of the fitting member 23 over the larger outer coupler flange 32. This is necessary because if coupler flange 32 were perfectly circular, it would be larger than bore 28 and would prevent the installation of fitting member 23. Therefore, following the installation process described above, fitting member 23 is passed over flanges 32 and 33 and is generally located over the body of valve coupler 31, as shown in FIG. 3.

A substantially non-compressible, non-metallic captive ring 36 is then slipped over outer coupler flange 32, to rest within the annular space or gap 31a defined between the outer and inner coupler flanges 32 and 33. Captive ring 36 may be manufactured from a material that is resistant to plastic flow under compressive forces. By way of example only, such material may include glass fiber, a hard rubber, or a hard plastic. Optionally, the captive ring 36 may be made of conductive materials and/or the same material as the coupler housing 31 and/or the fitting member 23. The inner diameter of captive ring 36 is smaller than the diameter of outer coupler flange 32. Therefore, captive ring 36 may be split at 36a, as shown in FIGS. 3 and 5, to facilitate its installation over outer coupler flange 32.

Figure 8:
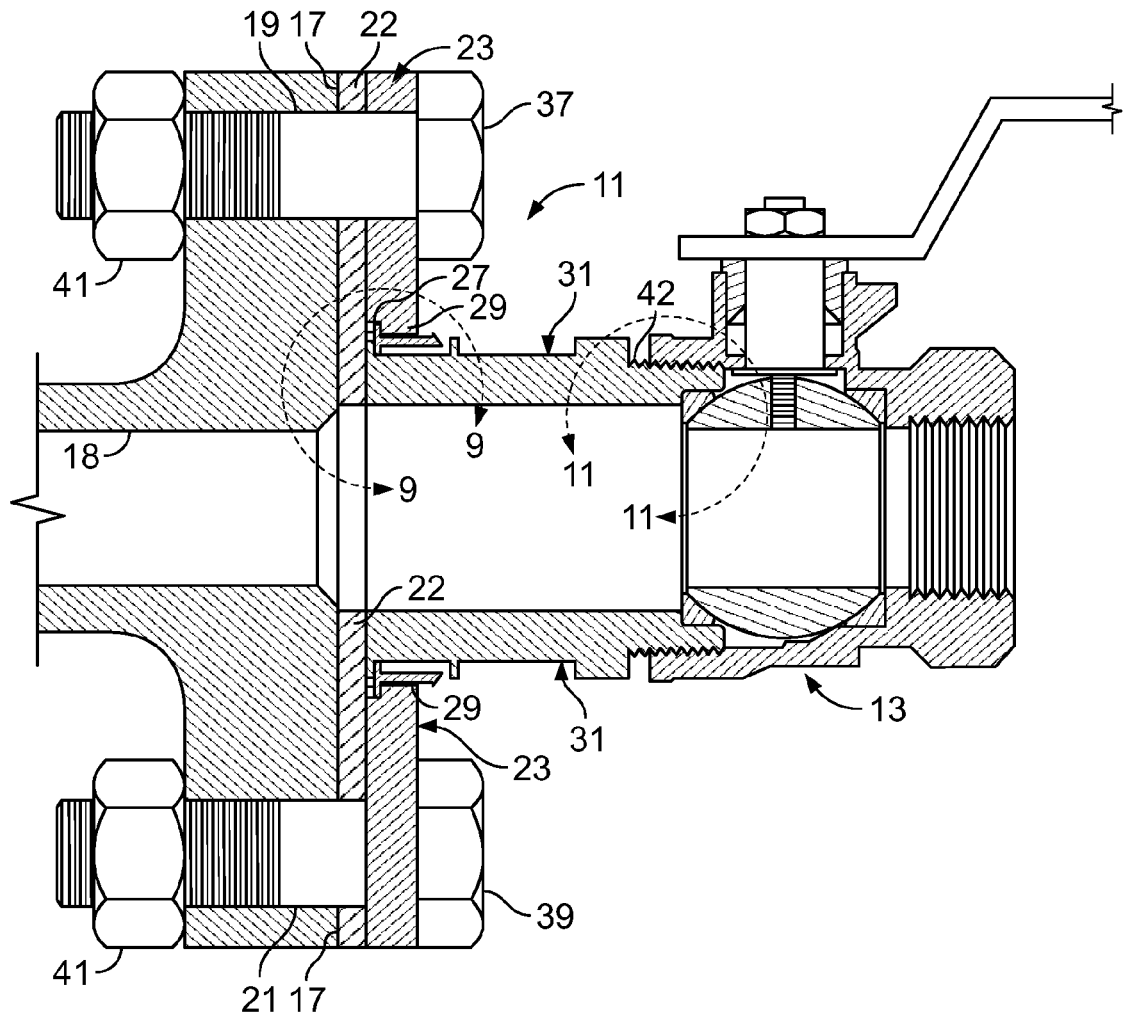
FIG. 8 is a longitudinal, cross-sectional view of the coupling assembly and a valve.
Figure 9:
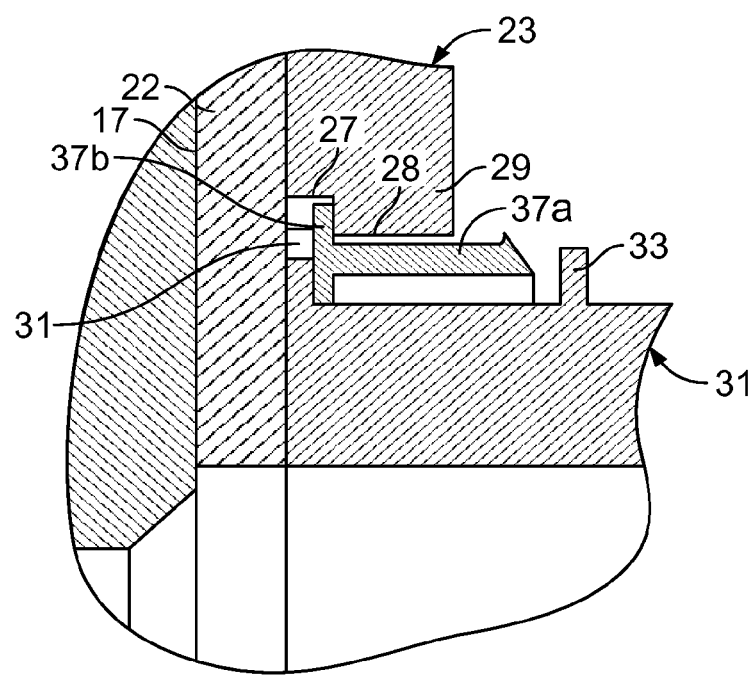
FIG. 9 is a detail inset view, taken on the line 9-9 in FIG. 8.

One configuration for captive ring 36 is generally "T-shaped" in cross-section, as shown particularly in FIG. 4. Thus, after installation of captive ring 36 between outer coupler flange 32 and inner coupler flange 33, a short top portion 37 of the "T" structure lies against the back face of the outer coupler flange 32. (See, FIGS. 8 and 9). The other side of captive ring 36 is provided with a circumferential retainer barb 38. With ring 36 installed, fitting member 23 is moved upstream, so that it lies generally over ring 36. Retainer barb 38 then holds fitting member 23 in place over ring 36.

The outer diameter of the ring 36 is greater than the diameters of the bore 28 and the outer coupler flange 32. Thus, when the fitting member 23 is snugged up against the gasket 22 and the line flange 14, the short top portion of the "T" structure is interposed between the lip 29 and the inner face of the outer coupler flange 32. Means to interconnect fitting member 23 and line flange 14 are provided by bolts 39 and nuts 41. By tightening bolts 39 and 41, fitting member 23 is connected to the line flange 14 with gasket 22 therebetween, compressing the lip 29 against the captive ring 36 and the outer coupler flange 32.

Figure 11:
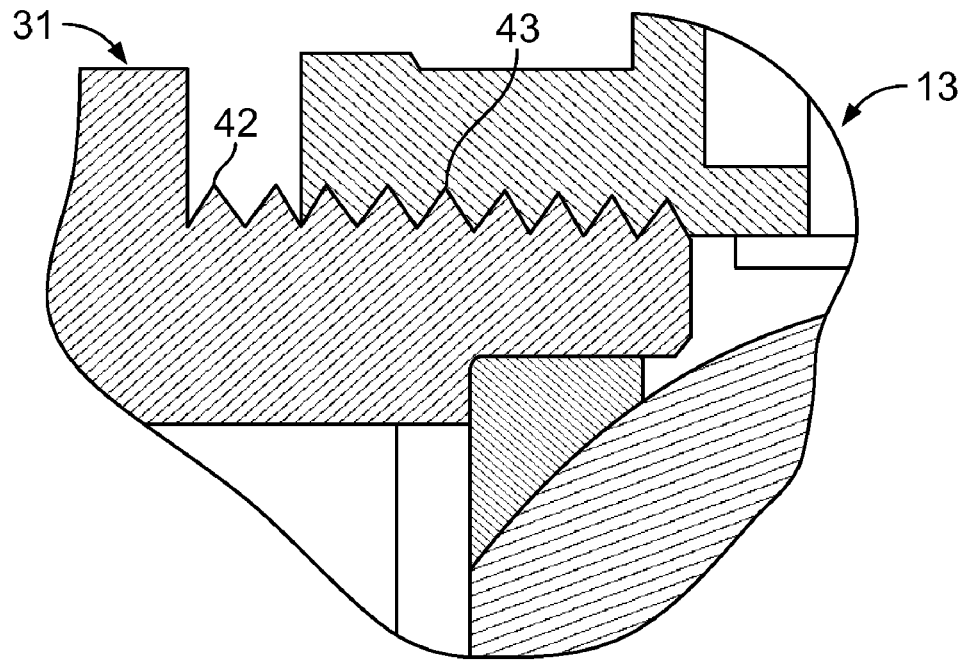
FIG. 11 is a detail inset view, taken on the line 11-11 in FIG. 8, showing a threaded interconnection between the valve coupler and the valve.
Figure 12:
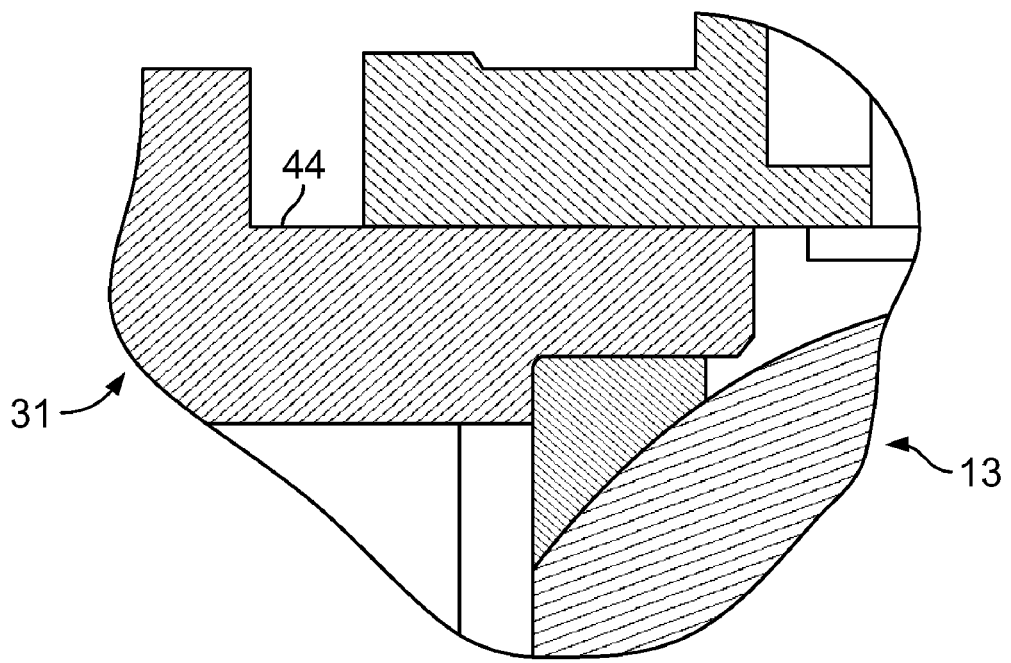
FIG. 12 is a detail inset view, showing an alternative sweat interconnection between the valve coupler and the valve.

External threads 42 are provided around the downstream end of valve coupler 31. Internal threads 43 are provided around the upstream end of valve 13. In this manner, valve 13 is threadably attached to the coupling assembly 11. (See, FIGS. 8 and 11). Alternatively, valve coupler 31 may be provided with a sweat fitting 44, in which case valve 13 may be soldered to coupling assembly 11. (See, FIG. 12).

Figure 10:
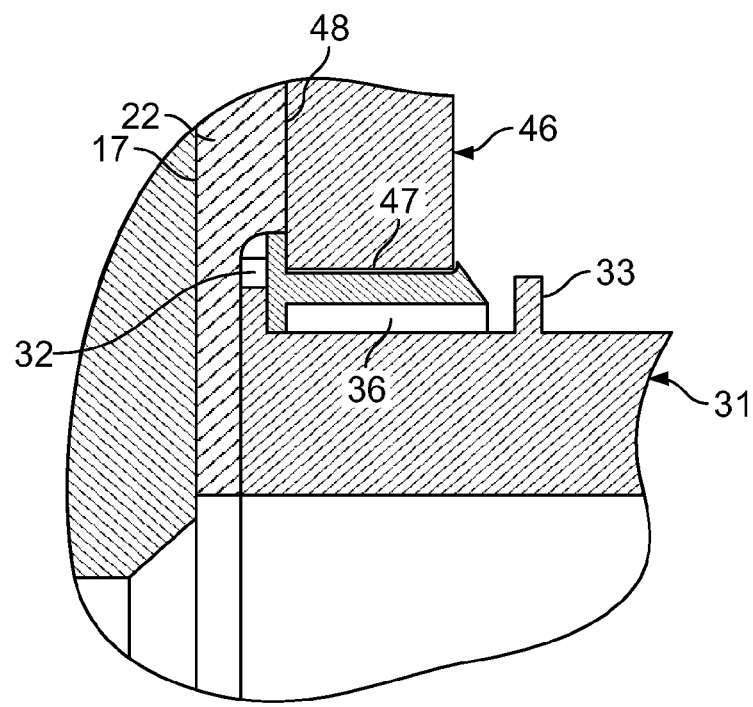
FIG. 10 is a detail inset view, showing an alternative construction for the pump flange which lacks a lip in its central aperture.

An alternative construction for the valve flange is shown in FIG. 10. Valve flange 46 is identical to fitting member 23, except it lacks two bores of different diameters and the attendant lip. Rather, flange 46 includes a single diameter bore 47. The diameter of bore 47 is such that it can pass over inner coupler flange 33 but not over the larger outer coupler flange 32. Thus, flange 46 must be installed from the downstream side of valve coupler 31, prior to the time that the valve 13 is installed. In this construction, when the coupling assembly 11 is bolted together, a second mating surface 48 of the flange 46 compresses against the short top portion of the "T" structure of the ring 36. Ring 36, in turn, compresses against outer coupler flange 32 which partially deforms and intrudes inwardly against gasket 22.

Figure 13:
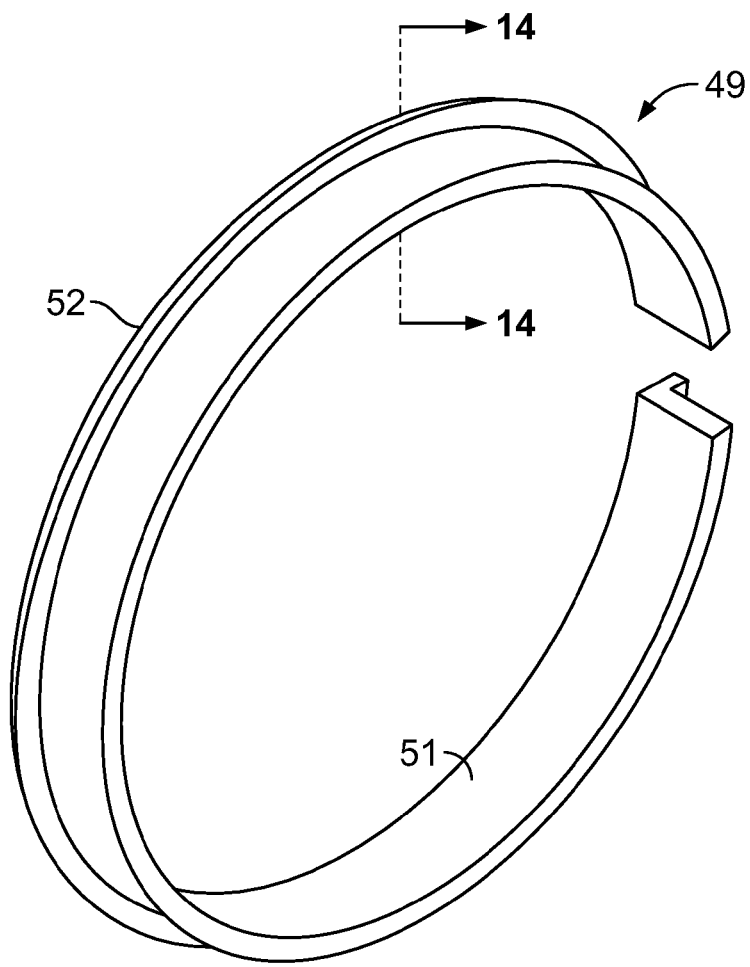
FIG. 13 is a perspective view of an alternative construction for the split ring.
Figure 14:
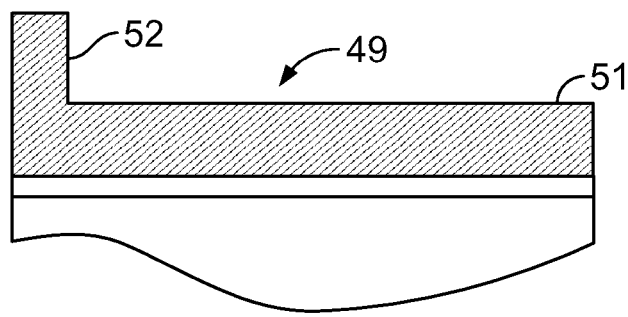
FIG. 14 is a cross-sectional view taken on the line 14-14 in FIG. 13.

Another configuration for the captive ring is shown in FIGS. 13 and 14. Captive ring 49 is "L" shaped in cross-section, having a base portion 51 and a foot portion 52. Captive ring 49 is split in one section, in the same manner and for the same purpose as captive ring 36. Captive ring 49 may be used in connection with the previously discussed valve coupler 31, or with an alternative construction discussed below.

Figure 15:
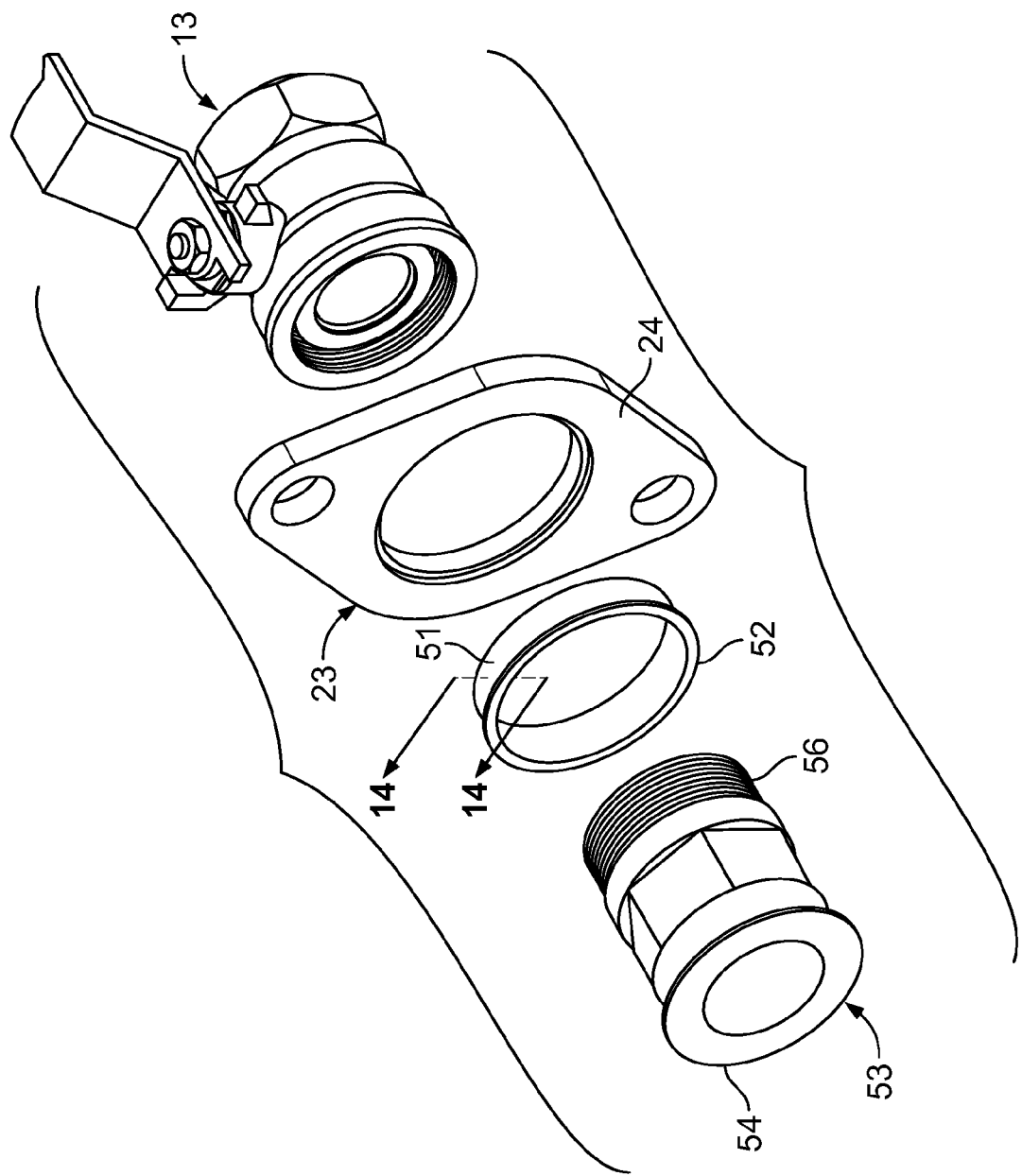
FIG. 15 is an exploded perspective view of an alternative embodiment of the coupling assembly.
Figure 17:
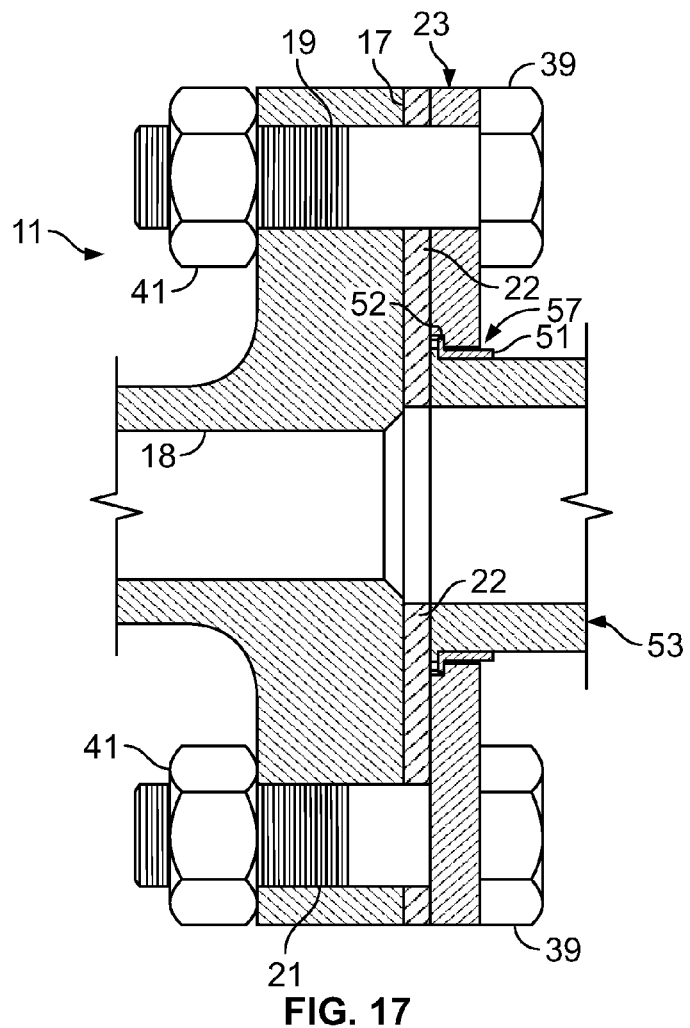
FIG. 17 is a cross-sectional of the alternative embodiment of the coupling assembly shown in FIG. 15.

FIGS. 15 and 17 show alternative constructions both for the captive ring and for the valve coupler employed in the coupling assembly 11. Valve coupler 53 includes a single outer coupler flange 54 on one end, and an externally threaded portion 56 on the other end. Otherwise, valve coupler 53 is identical in features and in function to the previously described valve coupler 31. A captive ring 57 is identical to the previously described captive ring 49, except it is not split. Thus, in the area where cross-sectional views are taken in FIGS. 13 and 15, captive rings 49 and 57 are identical in features.

The inner diameter of captive ring 57 is such that it passes freely over the body of valve coupler 53 from the threaded portion 56 to the rear face of coupler flange 54. Next, fitting member 23 is installed over valve coupler 53, so that it substantially surrounds captive ring 57. In FIG. 17, an assembled coupling assembly 11 incorporating valve coupler 53 and captive ring 57 is shown. As previously explained, bolts 39 and nuts 41 are used to secure the assembly and maintain its components in compressive, sealing relation. A valve 13 is threadably affixed to the threaded portion 56 to complete the system.

Figure 16:
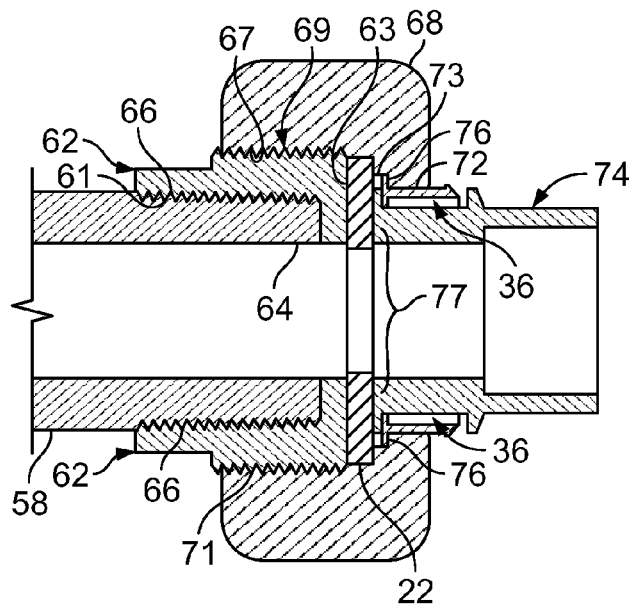
FIG. 16 is a cross-sectional view of an electrolysis-resistant coupling assembly for a fluid line.

Another embodiment of the invention comprises an electrolysis-resistant coupling assembly 58 shown in FIG. 16. Coupling assembly 58 may be used for any application in a fluid line calling for a dielectric coupler. Assembly 58 incorporates many of the features already discussed above, so where common elements are used, the same component numbering scheme will be employed.

Coupling assembly 58 has an inlet line 59 provided with external threads 61, on its downstream end. A line fitting 62, has a first mating surface 63 on one end and a fluid passageway 64 extending therethrough. Line fitting 62 includes inner threads 66 extending inwardly from the other end for coupling to the external threads 61 of the fluid line. Line fitting 62 further includes outer threads 67 extending inwardly over fitting 62, from the first mating surface 63.

Assembly 58 also includes a coupler nut 68 having an aperture 69 extending therethrough. Aperture 69 has inner threads 71 extending inwardly from a first end Inner threads 71 are adapted for threadably engaging outer threads 67 of line fitting 62. Aperture 69 further includes a lip portion 72, extending inwardly from a second end of coupler nut 68, and a shelf portion 73 between inner threads 71 and lip portion 72.

Assembly 58 further includes a line coupler 74, having an one end provided with a coupler flange 76 having a second mating surface 77. A gasket 22 is provided between and in contingent relation with first mating surface 63 and second mating surface 77. A substantially non-compressible, electrically non-conductive captive ring 36 is provided. Captive ring 36 is interposed between lip portion 72 and coupler flange 76.

In final assembly, coupler nut 68 is rotatably threaded over outer threads 67 of line fitting 62, urging lip portion 72 into compressive relation against captive ring 36 and outer coupler flange 76. The downstream end of line coupler 74 may be threadably or sweat fitted to a downstream line to complete installation of the assembly 58 into a fluid system.

Figure 18:
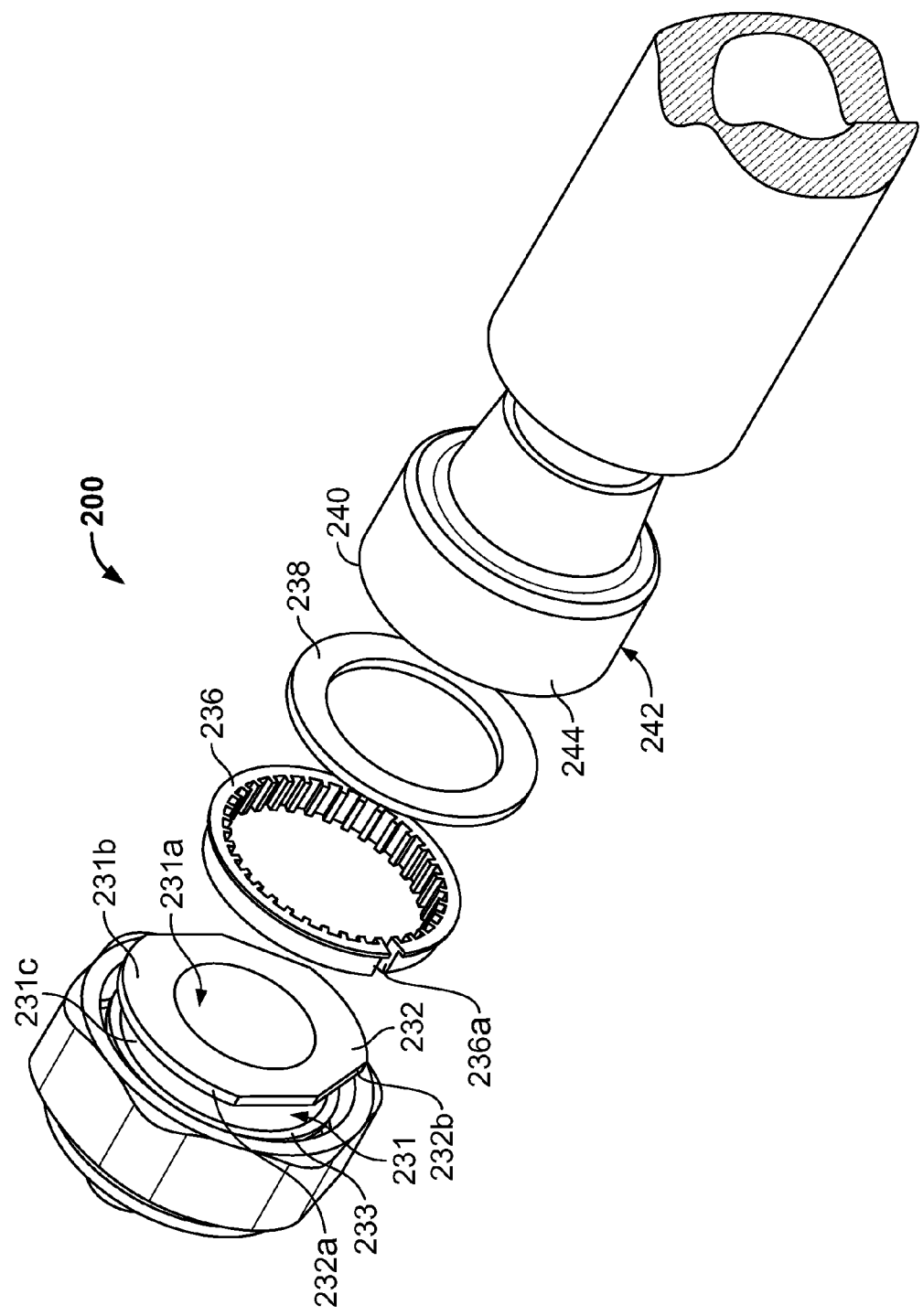
FIG. 18 illustrates a universal fluid coupling assembly formed in accordance with an alternative embodiment.

FIG. 18 illustrates an universal fluid coupling assembly 200 formed in accordance with an alternative embodiment. The coupling assembly 200 of FIG. 18 includes a union type fitting member, in place of a flange type fitting member. The coupling assembly 200 includes a coupler housing 231 having an inner bore 231a that extends along an axis and opens onto a mating end 231b of the coupler housing 231. The coupler housing 231 has an outer perimeter 231c that includes inner and outer coupler flanges 233 and 232 that extend about the outer perimeter 231c. The outer coupler flange 232 is located proximate the mating end 231b. The outer coupler flange 232 has a periphery that follows a predetermined circumferential envelope 232a. The outer perimeter of the outer coupler flange 232 has at least one discontinuity 232b in the circumferential envelope 232a to define a blank area in the envelope 232a.

Figure 19:
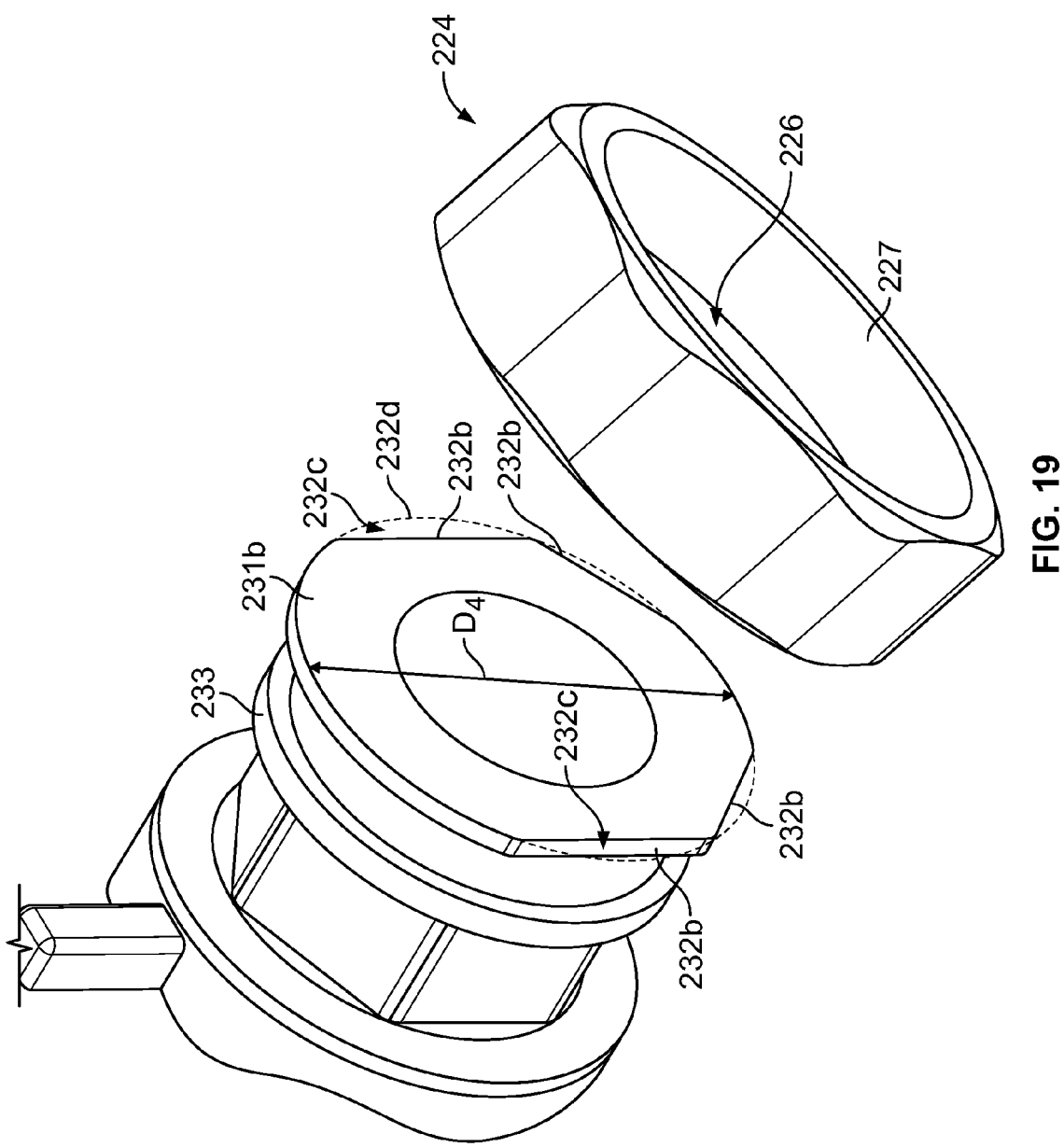
FIG. 19 illustrates an isometric view of the coupling assembly shown in FIG. 18 in more detail to better illustrate inner and outer coupler flanges.

FIG. 19 illustrates an isometric view of the coupling assembly 200 in more detail to better illustrate the inner and outer coupler flanges 233 and 232. As shown in FIG. 19, the outer coupler flange 232 includes a circular perimeter 232d (as denoted by dashed lines). The outer perimeter 232d forms an even continuous circle having a constant diameter D4. FIG. 19 illustrates the discontinuities 232b that form blank areas 232c within the outer perimeter 232d.

A fitting member 224 is shown in FIG. 19 tilted at an angle with respect to the mating end 231b of the coupler housing 231. The fitting member 224 has an aperture 226 extending therethrough the aperture 226 is circular and has a diameter that is less than the diameter D4 of the circumferential envelope 232a formed by the outer coupler flange 232. The fitting member 224 is loaded over the outer coupler flange 232 onto the outer perimeter 231c of the coupler housing 231 by orienting the fitting member 224 in a non-orthogonal relation with the coupler housing 231 such that the outer coupler flange 232 passes through the aperture 226. The fitting member 224 includes an interior annular surface 227 that is threaded to form a female union type fitting to be threaded onto a similarly threaded male union fitting. Optionally, the fitting member 224 may have threads on the exterior thereof, to form a male type union.

Return to FIG. 18, the fitting member 224 is shown loaded onto the coupler housing 231 and pulled away from the mating end 231b. FIG. 18 further illustrates a captive ring 236 having a split 236a therein to permit the captive ring 236 to flare outward and to fit over the outer coupler flange 232 and rest in the groove behind the outer coupler flange 232. A seal 238 is provided to rest against the mating end 231b and form a seal between the coupler housing 231 and a front face 240 of a mating male union connector 242. An exterior surface 244 of the male union 242 is threaded to be securely engaged with the threads within the fitting member 224.

It is understood that the union-type fitting member 234 may be loaded onto the coupler housing 31 of FIG. 2, while the flange-type fitting member 24 may be loaded onto the coupler housing 231 of FIGS. 18 and 19. Optionally, the fitting member 224 or 24 may be a sweat-type fitting, an NPT-type fitting and the like.

The fluid coupling assembly can be configured for installation in different fluid distribution systems based on the type of mating coupling. Different types of fitting members what may be selectively mounted on the outer perimeter of the coupler housing. A first fitting member constitutes one of a union-type, a flange-type, a sweat-type and an NTP-type fitting, while the second fitting member may constitute a different one of the union-type, flange-type, sweat-type and NTP-type fitting. Both of the first and second fitting members are configured to be used with the same coupler housing. The first or second fitting member is selected to use with the coupler housing based on the type of mating coupling to be joined thereto. The selected one of the first and second fitting members is then loaded over the outer coupling flange onto the outer perimeter of the coupler housing by first orienting the selected one of the first and second fitting members in a non-orthogonal relationship with the coupler housing to permit the outer coupler flange to pass through the aperture.

After the selected one of the first and second fitting members is loaded onto the coupler housing, a captive ring is then loaded over the outer coupler flange and the selected fitting member is drawn up onto the captive ring to seat the captive ring against the outer coupler flange within the aperture of the fitting member. Optionally, the coupler housing may initially be provided with the one type of fitting member, which is removed from the coupler housing and replaced with a different type of fitting member. To remove the fitting member, it is pushed up onto the coupler housing away from the mating end and the captive ring is removed. Once the captive ring is removed, the fitting member is tilted and unloaded.

While particular elements, embodiments and applications of the present invention have been shown and described, it will be understood, of course, that the invention is not limited thereto since modifications may be made by those skilled in the art. It is therefore contemplated by the appended claims to cover such modifications that incorporate those features which come within the spirit and scope of the invention.

What is claimed is:

1. An electrolysis-resistant coupling assembly for connection with a line fitting of a fluid line, the coupling assembly comprising:

a metal fitting having a first mating surface and having an aperture extending therethrough, wherein the fitting is configured to be aligned with and face the line fitting for coupling thereto;

a metal coupler having one end provided with an outer coupler flange formed integral with the coupler, the outer coupler flange extending radially outward from the metal coupler, the fitting being loaded onto the coupler such that the outer coupler flange passes through the aperture; and a substantially non-compressible, electrically non-conductive rigid captive ring, the captive ring being separate and discrete from the fitting and the coupler, the captive ring being positioned against the outer coupler flange and interposed between the fitting and the coupler to provide electrical separation between the fitting and the coupler, wherein the fitting is held against the captive ring when the fitting is interconnected with the line fitting, wherein the captive ring includes a base extending axially with respect to the axis, the captive ring including a leg extending radially with respect to the axis, the captive ring including a retention barb extending radially outward from the base, the retention barb and the leg capturing the fitting therebetween to hold the fitting in position with respect to the coupler.

2. The coupling assembly of claim 1, wherein the aperture in the fitting includes a first bore and a second bore forming a lip, the captive ring engaging the lip.

3. The coupling assembly of claim 1, wherein the captive ring includes a base extending axially with respect to the axis, the captive ring including a leg extending radially with respect to the axis, the leg being interposed between the outer coupler flange and the fitting.

4. The coupling assembly of claim 1, wherein the fitting is a flange fitting having a plurality of bolt holes configured to receive bolts therethrough, the flange fitting being configured to be coupled to the line fitting which represents a line flange fitting having a plurality of bolt holes.

5. The coupling assembly of claim 1, wherein the fitting is an NPT fitting having inner threads, the line fitting having outer threads, wherein the NPT fitting is configured to be coupled to the line fitting by a threaded coupling.

6. The coupling assembly of claim 1, wherein the fitting is an NPT fitting having a second end opposite the first mating surface, the aperture extending between the first mating surface and the second end and having inner threads, the NPT fitting having a lip portion extending inwardly from the second end, wherein the NPT fitting is configured to be coupled to the line fitting by a threaded coupling.

7. The coupling assembly of claim 1, wherein the fitting is a sweat fitting having a smooth inner surface along the aperture, wherein the sweat fitting is configured to receive the line fitting and be soldered to the line fitting by a sweat coupling.

8. The coupling assembly of claim 1, wherein the fitting is a sweat fitting having a second end opposite the first mating surface, the aperture extending between the first mating surface and the second end and having a smooth inner surface, the sweat fitting having a lip portion extending inwardly from the second end, wherein the sweat fitting is configured to be coupled to the line fitting by a sweat coupling.

9. The coupling assembly of claim 1, wherein the fitting is loaded over the captive ring and is freely rotatable with respect to each of the captive ring and the coupler.

10. The coupling assembly of claim 1, wherein the captive ring is snapped around the coupler and is freely movable with respect to each of the fitting and the coupler.

11. The coupling assembly of claim 1, wherein the captive ring is made from a material which is resistant to plastic flow under compressive forces.

12. The coupling assembly of claim 1, wherein the outer coupler flange has a non-circular outer periphery with different diametrical measurements, facilitating installation of the fitting over the outer coupler flange when an axis of the fitting is not coincident with an axis of the coupler.

13. An electrolysis-resistant coupling assembly for connection with a line fitting of a fluid line, the coupling assembly comprising:
a metal fitting having a first mating surface and an aperture extending therethrough, the aperture having a first bore and a second bore, the second bore being larger than the first bore forming a lip spaced from the first mating surface;
a metal coupler having one end provided with an outer coupler flange and an inner coupler flange, the inner and outer coupler flanges extending radially outwardly from the coupler proximate the one end and being arranged in axially spaced relation thereon;
a substantially non-compressible, electrically non-conductive captive ring extending at least partially circumferentially around the coupler and being positioned between the outer coupler flange and the inner coupler flange such that the captive ring provides complete separation between the fitting and the coupler, the captive ring having a base extending axially and a leg extending radially outward from the base, the leg being interposed between the lip and the outer coupler flange of the coupler, wherein the fitting is configured to interconnect with the line fitting to hold the lip against the captive ring and the outer coupler flange.

14. The coupling assembly of claim 13, wherein the captive ring includes a retention barb extending radially outward from the base, the retention barb and the leg capturing the fitting therebetween to hold the fitting in position with respect to the coupler.

15. The coupling assembly of claim 13, wherein the fitting is a flange fitting having a plurality of bolt holes configured to receive bolts therethrough, the flange fitting being configured to be coupled to the line fitting which represents a line flange fitting having a plurality of bolt holes.

16. The coupling assembly of claim 13, wherein the fitting is an NPT fitting having inner threads, the line fitting having outer threads, wherein the NPT fitting is configured to be coupled to the line fitting by a threaded coupling.

17. The coupling assembly of claim 13, wherein the fitting is an NPT fitting having a second end opposite the first mating surface, the aperture extending between the first mating surface and the second end and having inner threads, the NPT fitting having a lip portion extending inwardly from the second end, wherein the NPT fitting is configured to be coupled to the line fitting by a threaded coupling.

18. The coupling assembly of claim 13, wherein the fitting is a sweat fitting having a smooth inner surface along the aperture, wherein the sweat fitting is configured to receive the line fitting and be soldered to the line fitting by a sweat coupling.

19. The coupling assembly of claim 13, wherein the fitting is a sweat fitting having a second end opposite the first mating surface, the aperture extending between the first mating surface and the second end and having a smooth inner surface, the sweat fitting having a lip portion extending inwardly from the second end, wherein the sweat fitting is configured to be coupled to the line fitting by a sweat coupling.

20. The coupling assembly of claim 13, wherein the fitting is loaded over the captive ring and is freely rotatable with respect to each of the captive ring and the coupler.

21. The coupling assembly of claim 13, wherein the captive ring is snapped around the coupler and is freely movable with respect to each of the fitting and the coupler.

22. The coupling assembly of claim 13, wherein the captive ring is made from a material which is resistant to plastic flow under compressive forces.

23. The coupling assembly of claim 13, wherein the outer coupler flange has a non-circular outer periphery with different diametrical measurements, facilitating installation of the fitting over the outer coupler flange when an axis of the fitting is not coincident with an axis of the coupler.

24. An electrolysis-resistant coupling assembly for connection with a line fitting of a fluid line, the coupling assembly comprising:
a metal fitting having a first mating surface and an aperture extending therethrough;

a metal coupler having one end provided with an outer coupler flange and an inner coupler flange, the flanges extending radially outwardly from the one end and being arranged in axially spaced relation thereon; and a substantially non-compressible, electrically non-conductive captive ring extending at least partially circumferentially around the coupler and being positioned between the outer coupler flange and the inner coupler flange, the captive ring includes a base, a leg extending outward from the base, the captive ring being positioned between the fitting and the coupler to provide a physical barrier between the fitting and the coupler.

25. The coupling assembly of claim 24, wherein the captive ring includes an opening having a diameter that is less than both an outer diameter of the outer coupler flange and an outer diameter of the inner coupler flange, the captive ring being split to facilitate positioning of the ring between the outer coupler flange and the inner coupler flange.

26. The coupling assembly of claim 24, wherein the captive ring extends along an entire axial overlapping length of the fitting between the fitting and the coupler to provide a physical barrier between the fitting and the coupler.

27. The coupling assembly of claim 24, wherein the fitting is a flange fitting having a plurality of bolt holes configured to receive bolts therethrough, the flange fitting being configured to be coupled to the line fitting which represents a line flange fitting having a plurality of bolt holes.

28. The coupling assembly of claim 24, wherein the fitting is an NPT fitting having inner threads, the line fitting having outer threads, wherein the NPT fitting is configured to be coupled to the line fitting by a threaded coupling.

29. The coupling assembly of claim 24, wherein the fitting is an NPT fitting having a second end opposite the first mating surface, the aperture extending between the first mating surface and the second end and having inner threads, the NPT fitting having a lip portion extending inwardly from the second end, wherein the NPT fitting is configured to be coupled to the line fitting by a threaded coupling.

30. The coupling assembly of claim 24, wherein the fitting is a sweat fitting having a smooth inner surface along the aperture, wherein the sweat fitting is configured to receive the line fitting and be soldered to the line fitting by a sweat coupling.

31. The coupling assembly of claim 24, wherein the fitting is a sweat fitting having a second end opposite the first mating surface, the aperture extending between the first mating surface and the second end and having a smooth inner surface, the sweat fitting having a lip portion extending inwardly from the second end, wherein the sweat fitting is configured to be coupled to the line fitting by a sweat coupling.

* * * * *